United States Patent [19]

Muller et al.

[11] Patent Number: 4,926,539
[45] Date of Patent: May 22, 1990

[54] APPARATUS HAVING A LIFTING FRAME FOR PROCESSING WORKPIECES

[75] Inventors: Karl H. Muller, Ingolstadt; Volker Riedl, Gaimersheim; Bernhard Arbesmeier, Altmannstein/Hagenhill, all of Fed. Rep. of Germany

[73] Assignee: Audi AG, Ingolstadt, Fed. Rep. of Germany

[21] Appl. No.: 276,430

[22] PCT Filed: Dec. 21, 1986

[86] PCT No.: PCT/EP86/00773
§ 371 Date: Jun. 17, 1988
§ 102(e) Date: Jun. 17, 1988

[87] PCT Pub. No.: WO87/03834
PCT Pub. Date: Jul. 2, 1987

[30] Foreign Application Priority Data

Dec. 21, 1985 [DE] Fed. Rep. of Germany ....... 3545537

[51] Int. Cl.⁵ .............................................. B23Q 3/155
[52] U.S. Cl. ........................................ 29/568; 29/700; 29/791
[58] Field of Search ................. 29/568, 700, 791, 795; 228/4.1, 45

[56] References Cited

U.S. PATENT DOCUMENTS 4,448,341 5/1984 Fujikawa et al. ................. 29/568 X
4,479,576 10/1984 Di Rosa .............................. 198/774

FOREIGN PATENT DOCUMENTS 0065834 5/1982 European Pat. Off. .
2739010 3/1978 Fed. Rep. of Germany .
3341169 4/1985 Fed. Rep. of Germany .

OTHER PUBLICATIONS

"Widerstands-Schweissen", Vortrage Der 4. Stuttgarter Sondertagung, Widerstands-Schweisstechnik 1960, pp. 13–19.
W. Stanley, "Resistance Welding, Designing, Tooling, and Applications", McGraw-Hill Book Company, Inc., New York, 1950, pp. 110–113.

Primary Examiner—Steven C. Bishop
Attorney, Agent, or Firm—Lalos & Keegan

[57] ABSTRACT

An improved device for processing workpieces is provided having a lower tool which receives a workpiece and which can be moved against an upper tool where the workpiece can be processed. It also has a lifting frame with a lifting table and a separate tool frame which can be mounted on the lifting frame in an easily releasable manner. The present device uses a modular construction to enable the tool frames to be easily interchanged. The tool frame consists of a head plate upon which is mounted the upper tool, a base plate upon which is mounted the lower tool and a plurality of columns there-between. The base plate is detachably connected to the tool frame. When a tool frame is to be moved onto the lifting frame, the base plate must be attached to the tool frame. Then the tool frame can be placed onto the columns of the lifting frame. Finally, the base plate can be secured to the lifting table of the lifting frame and the connection between the base plate and the tool frame can be released to enable the workpiece to be raised by the lifting table into the processing position.

26 Claims, 5 Drawing Sheets

APPARATUS HAVING A LIFTING FRAME FOR PROCESSING WORKPIECES

BACKGROUND AND DISCUSSION OF THE INVENTION

The present invention relates to a device for processing workpieces wherein a lower tool, which receives the workpiece, can be moved up against an upper tool by a lifting frame such that the workpiece can be processed in this position. More particularly it relates to such a device having an improved lifting frame which permits the upper and lower tools to be changed easily. The present invention is particularly useful for devices which do multispot-welding.

Congeneric devices are usually used as multispot-welding equipment. The presently used devices have a frame which usually has four perpendicular columns. The lower section of the frame accommodates a lifting device between the columns. The lifting table of this lifting device carries the lower tools. When the lifting table is lowered, the workpieces can be placed onto the lifting table and among the lower tools. When the lifting table is lifted, the workpiece is presented to the upper tools for processing.

Typically, the upper tools hang on a head plate which rests on the columns, while the lower tools are connected to the upper tools (for example, by assembly columns) such that when the tools are to be exchanged, the complete tool set (both upper and lower tools) is lifted out of the frame by means of a crane. The tool changes in these devices are very time-consuming, since many parts have to be released, fastened again and also set up for a different workpiece or process. Also, a large amount of head room above the device is required since the columns of the frame extend from the floor up to the head plate and during changing the tool set has to be moved such that its lower edge passes over the top of the columns. Thus, it would be desirable to have a device which overcomes these problems by improving the tool-changing efficiency while maintaining or improving the quality of the work.

The present invention provides a device which is horizontally subdivided into a tool frame and a lifting frame. The tool frame comprises a plurality of perpendicular columns, a head plate connected to the columns and a base plate detachably fastened to the columns. The tool frame can be mounted on the lifting frame in an easily releasable manner. In the mounted state, the connection between the base plate and the columns can be released and a connection can be made between the base plate and the lifting table of the lifting frame. This creates two constructional groups, namely, the lifting frame and the tool frame which can be quickly connected to one another and also separated again and which can optimally fulfill their different tasks.

In particular, the present invention enables a different tool frame to easily be made available for the different workpieces to be processed. It is possible with the present invention to make an external adjustment to the tools or the tool frame which does not impede the production process. Additionally, the present invention provides a quick-changing means which, compared with that used in known tool-changing devices, only requires a fraction of the resetting time, thereby making it possible not only to convert the device upon completion of a production series but also to meet other stated requirements during the course of production, such as continuous or batch production.

Another advantage of the present invention is that the tool frame, upon completion of a series of steps on a workpiece, can be easily used for other tasks, such as for spare-parts production. The tool frame, with both the upper and lower tools, can also be stored for use at a later time or it can be conveyed to another production site where it is mounted onto an identical lifting frame for immediate use. If the tool frame is not to be stored for use at a later time, it can continue to be used for another purpose by converting or exchanging the tools secured on the tool frame. Also, the lifting frame can be fully reutilized for constructing a new installation.

The device according to the present invention uses a system of modular construction wherein the individual components (such as lifting and tool frames) can be set up or used at different locations. When combined, these different components form different, fully functionable devices. Moreover, the lifting frames, since they do not contain any components specific to the tools or workpieces being used, can be used universally without any resetting. It is the tool frames which contain the components and tools that are specific to the different workpieces. The tool frames can be made available in sufficient number for each workpiece such that when a workpiece is finished being produced, the tool frame can be converted without difficulty to one needed to work on a new workpiece. During this conversion process, no parts of the actual tool frame necessarily need to be replaced.

When a tool frame is to be mounted onto the lifting frame, the detachable base plate of the tool frame carrying the lower tools must first be fixed to the tool frame. Then the tool frame, with its columns, is placed onto the lifting frame and fastened thereto. Finally, the base plate is secured to the lifting table and then the connection between the base plate and the tool frame is released. This creates a unit which can move vertically inside the columns, which are now continuous. The unit is readily accessible and in the area wherein the tool frame adjoins the lifting frame requires no additional connecting elements between the columns despite the means of separation.

Preferably, a conveying means or a conveying device is attached to the tool frame and can insert the workpiece into the tool frame and remove it therefrom. The conveying device, except for the conveying arms contacting the part, can be standardized and thus be used in every tool frame. The conveying travel can be universally set via control cams. The drive of the conveying device is conveniently effected using a change-pole geared motor which ensures a high positioning accuracy. Optimum adjustment outside the production line under operating conditions as well as a quick changeover are also possible with this device.

So that a quick change of the tool frames can be undertaken without the aid of additional equipment such as a crane or a fork-lift truck with their considerable space requirement, it is preferable to have another tool frame on one of the two storage devices which directly adjoin the sides of the lifting frame. With such a arrangement, it is possible to carry out a quick change between two tool frames and thus to change to another workpiece without a great loss of time.

Each storage device preferably has a displacing unit for moving a tool frame from the lifting frame to the storage device and vice versa. This changing operation for the tool frame can be accomplished by just one person or it can be automated. The time-savings created by this tool-changing operation considerably increases the productivity of the machine. This becomes quite evident when the device according to the present invention is compared with previously used devices in which time-consuming assembly, setting and transport operations have to be carried out. Setting or resetting in the prior devices takes up so much time that it can only be carried out during prolonged production stoppages.

Preferably, the storage devices, on their upper side, carry a support means such as hardened strips, rollers or balls for ease of displacement and also have a locking mechanism for the stored tool frame. The easy displaceability resulting from the use of the hardened strips, rollers or balls means that only small drive forces are required and thus little energy and construction effort. On the other hand, easy displacement necessitates the use of a locking mechanism, which however, can easily be effected by mechanical or automatic pinning.

Preferably, a crank mechanism is used as the drive means for lifting and lowering the lifting table. The crank mechanism, which preferably performs a movement of 180° during the lifting movement or during the lowering movement, provides favorable force ratios and a more accurate means of setting when compared with the known mechanisms for lifting tables such as air cylinders, swing frames, etc. The crank mechanism is preferably driven by a motor-gearbox unit from which protrude shaft sections having first crank linkages to which are attached first crank pins which accommodate supports connected to the lifting table. Use of second and third crank linkages also enables favorable force ratios to be realized with little additional construction effort. A 90% displacement of the second crank linkage relative to the third crank linkage also prevents unfavorable concentration of force at the dead centers.

To achieve a large swivel angle for the crank linkages, at least two non-driven shaft sections are each interrupted and mounted on one side in such a way that a transmission member can pass though in between unimpeded. For the same reason, some or all of the transmission members and/or the supports acting on the lifting table can be arranged in an offset configuration. In practice, it is better if each of the two driven shaft sections is mounted in two bearings, the crank linkages are located between the bearings, and the driven shaft section is constructed so as to be separable via flanges between the motor-gearbox unit and the adjoining bearing. For maintenance and repair, the motor-gearbox unit can easily be pulled out of the lifting frame because of the flanges.

The motor for the motor-gearbox unit preferably comprises a direct-current motor which is controllable via a camshaft gear mounted on a shaft section. The lifting characteristic of the lifting table can be varied in a simple manner using a direct-current motor. Apart from the intermediate positions thereby possible, different speeds can also be applied.

The present invention also enables the lifting table to be guided on the columns of the lifting frame and to interact with the pressure cylinders which support the weight of the lifting table. Thus, the lifting table drive means can produce a smaller output while still lifting the lifting table. The pressure cylinders are conveniently connected to an accumulator in such a way that the pressure medium passes into the accumulator when the lifting table is being lowered and has an assisting effect on the lifting movement when the lifting table is being lifted. The volume of the accumulator in relation to the volume of the displaced pressure medium can be selected in such a way that only slight pressure differences arise during the lifting movement.

Preferably, hydraulic fluid is used as the pressure medium and a hydraulic unit is provided for building up and maintaining the pressure medium. Also, additional devices can be used to adapt the pressure level to various dead loads. The use of hydraulic fluid for the pressure medium ensures the greatest possible freedom from maintenance, since there is self-lubrication. Compared with air as a pressure medium, larger pressures are possible with hydraulic fluid with the result that the equipment is more compact. Also, improved overall efficiency can be obtained since hydraulic fluid, in contrast to air, operates with lower pressure drops. Preferably, the hydraulic unit is electrically driven and is located at the lifting frame. Due to the electric drive, only one type of energy is required for the lifting frame. Moreover, by locating the hydraulic unit at the lifting frame, the construction of a compact device having all necessary constructional groups is permitted.

Depending upon which tool frame is mounted onto the lifting frame, pressure adaptation due to the different weights of the lower tools carried by the lifting table can be useful to operate the device using the least amount of energy. This pressure adaptation to automatically set the pressure required in each case can be implemented in a variety of ways known to one skilled in the art such as by means of valves, pressure switches or other regulating devices which are manually adjustable or controlled by a certain signal. Other known measures and devices are provided to monitor the hydraulic pressure and in the event of a pressure drop of a certain size, automatically start the hydraulic unit and then switch it off. It is also necessary to start up the hydraulic unit when, after production has ended, the pressure is released and the device is restarted such as on the following day.

To accurately fix the tool frame, the lifting frame is preferably provided with centering bolts protruding upwards for interacting with the columns of the tool frame. An accurate and constant location of the tool frame relative to the lifting frame is always achieved by the centering bolts. The base plate of the tool frame is held on the tool frame in an accurately located position. Not until the tool frame is connected to the lifting frame via the centering bolts, however, is the lifting table connected to the base plate thereby ensuring that all the parts are located very accurately.

Means are provided for securing the base plate to the columns of the tool frame which ensure that the tool frame, when it is to be pushed by the storage devices over the lifting frame, can at the same time slide past the centering bolts protruding up from the lifting frame. Additionally, the connection between the base plate and the tool frame can be released and secured again manually without a great expenditure of force.

Preferably, the pins and sleeves used in one embodiment of the securing means also form a centering means when the lifting table is in the upper position. The centering occurs during every lifting movement, namely when the lifting table is moved into the upper position. It is precisely in this position that the centering means is particularly important, since a very accurate location of the toolframe base plate which carries the upper tools, is thereby achieved. This centering means ensures that during every lifting movement the location of the lower tools with respect to the upper tools is accurate to at least 1/10 mm. If the tools are, for example, welding tools, good spot-welding quality and long endurance of the electrodes is established as a result of the constant position of the welding units. The welding quality is still achieved by the present invention even though there is a lower standard for component parts. It is inter alia also the precise matching which occurs in the present invention that enables the optimum adjustment to occur outside production under strict operating conditions.

Other details, objects and advantages of the present invention will become more readily apparent from the following description of a presently preferred embodiment.

BRIEF DESCRIPTION OF THE DRAWINGS

In the accompanying drawings, a preferred embodiment of the present invention is illustrated, by way of example only, wherein.

DETAILED DESCRIPTION OF THE PREFERRED EMBODIMENT

Figure 1:
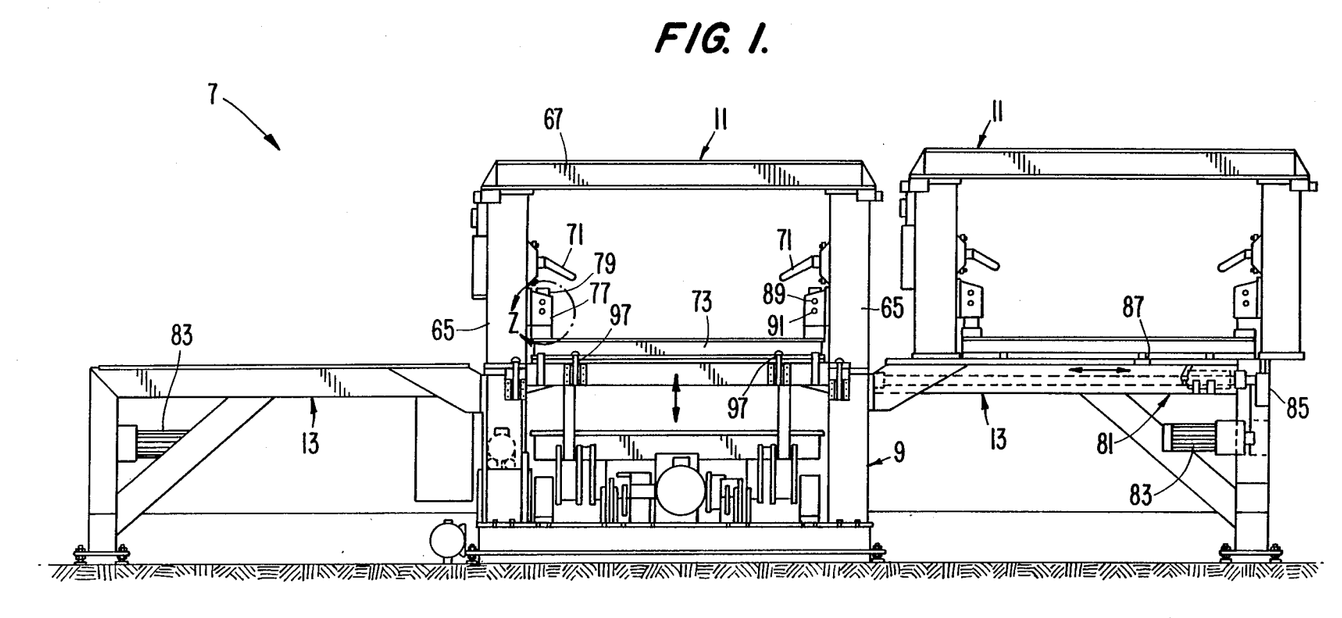
FIG. 1 shows a front view of the device of the present invention along with laterally adjoining storage devices for tool frames.

FIG. 1 shows a device of the present invention for the processing of workpieces comprising a lifting frame 9 and a tool frame 11 mounted thereon. Adjacent both sides of the lifting frame 9 are storage devices 13 each capable of accommodating one tool frame 11.

The lifting frame is best described with reference to FIG. 3, which shows the lifting frame as an individual unit. Mounted on a bottom plate 15 of the lifting frame 9 are four columns 17 which guide a lifting table 19 in a vertically displaceable manner. At its upper end, each column 17 is provided with a centering bolt 21 which serves to center the tool frame 11 which is to be mounted thereon.

A central motor-gearbox unit 23 is provided as a drive for the lifting frame 9. The motor of the motor-gearbox unit 23 is preferably formed by a direct-current motor 25 with the result that the lifting characteristic can easily be varied.

Protruding from the gearbox 27 of the motor-gearbox unit 23 are two shaft sections 29 and 31 which are constructed so as to be separable via flanges 33 and 35. This enables the motor-gearbox unit 23 to easily be disengaged from driven shaft sections 29 and 31 if it needs to be replaced in the event of repair. The driven shaft sections 29 and 31 are mounted in the inner bearing blocks 37 and the outer bearing blocks 39. In the area between the inner and outer bearing blocks 37 and 39, each shaft section is preferably provided with a first crank linkage 41, a second crank linkage 43 and a third crank linkage 45. Each of the crank linkages 41, 43 and 45 accommodates a first, second and third crank pin, respectively, which are designated by the numerals 47, 49 and 51, respectively. Each crank linkage 41, 43, 45 is formed by two arms 53 which are connected to one another via the respective crank pin. In the preferred arrangement, crank linkages which are adjacent to one another jointly use and share one arm 53.

Figure 3:
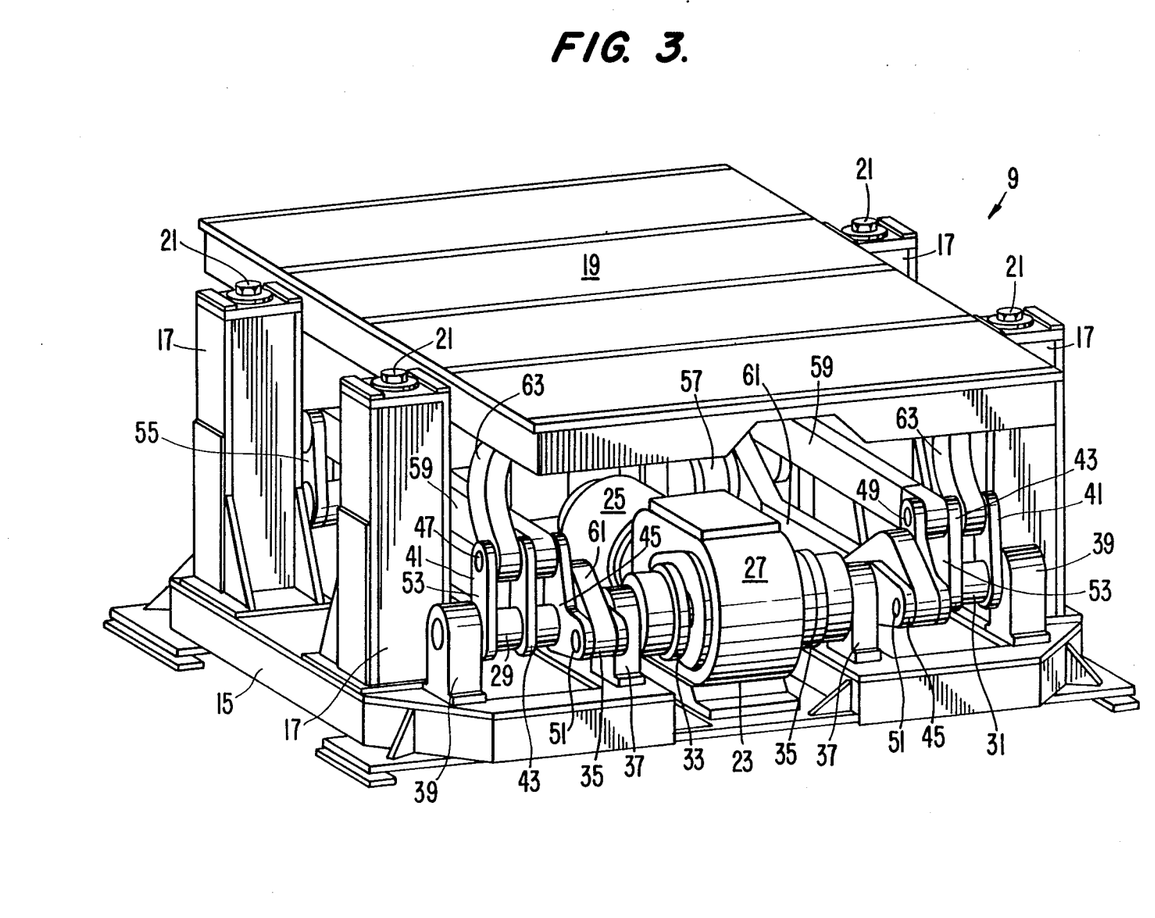
FIG. 3 shows a perspective view of the lifting table used in the device shown in FIG. 1.

Apart from the driven shaft sections 29 and 31, the lifting frame 9 also comprises two non-driven shaft sections 55 and 57 which are largely concealed in FIG. 3. Preferably, three crank linkages (not shown) are arranged on each of these shaft sections 55 and 57 in the same way as on the driven shaft sections 29 and 31. To transmit the forces from the driven to the non-driven shaft sections, first transmission members 59 are arranged between the second crank linkages of the driven and non-driven shaft sections, and second transmission members 61 are arranged between the third crank linkages of the driven and non-driven shaft sections. To achieve a constantly favorable force transmission, the second crank linkages preferably form an angle of 90° with the third crank linkages.

To enable the crank mechanism to rotate through 180°, the non-driven shaft sections 55 and 57 are each interrupted in such a way that the first transmission members 59 can pass through in-between unimpeded (see FIG. 1). All the first crank linkages accommodate via their crank pins one support 63 each of which is fixed to the lifting table 19 in an articulated manner. The lifting movement of the crank mechanism is transmitted to the lifting table 19 via the supports 63. In order to realize a crank rotation of 180°, the supports 63 (just like the first and second transmission members 59 and 61, respectively,) are arranged in an offset configuration the offset section always being led around the corresponding shaft section in the lowered position.

So that the entire force for raising the lifting table 19 and the lower tools to be fixed thereon later, does not have to be applied via the motor 25, lifting table 19 through the guides in the columns 17 interacts with pressure cylinders therein (not shown). These pressure cylinders, preferably filled with hydraulic fluid are connected to an accumulator. When the lifting table 17 is lowered, the pressure medium is forced into the accumulator whereas when the lifting table 19 is being lifted the pressure medium has an assisting effect on the lifting movement via the pressure cylinders. To build up and maintain the pressure medium, a hydraulic unit (not shown) is provided which is likewise electrically driven so that only one form of power need be supplied to the lifting frame 9. Various devices are provided in conjunction with the pressure system which can adapt the pressure level to various dead loads of the lifting table 19. Such devices are known to one skilled in the art and therefore it is not necessary to explain them here. Different dead loads result, for example, when lower tools of different weights are mounted on the lifting table 19.

Figure 2:
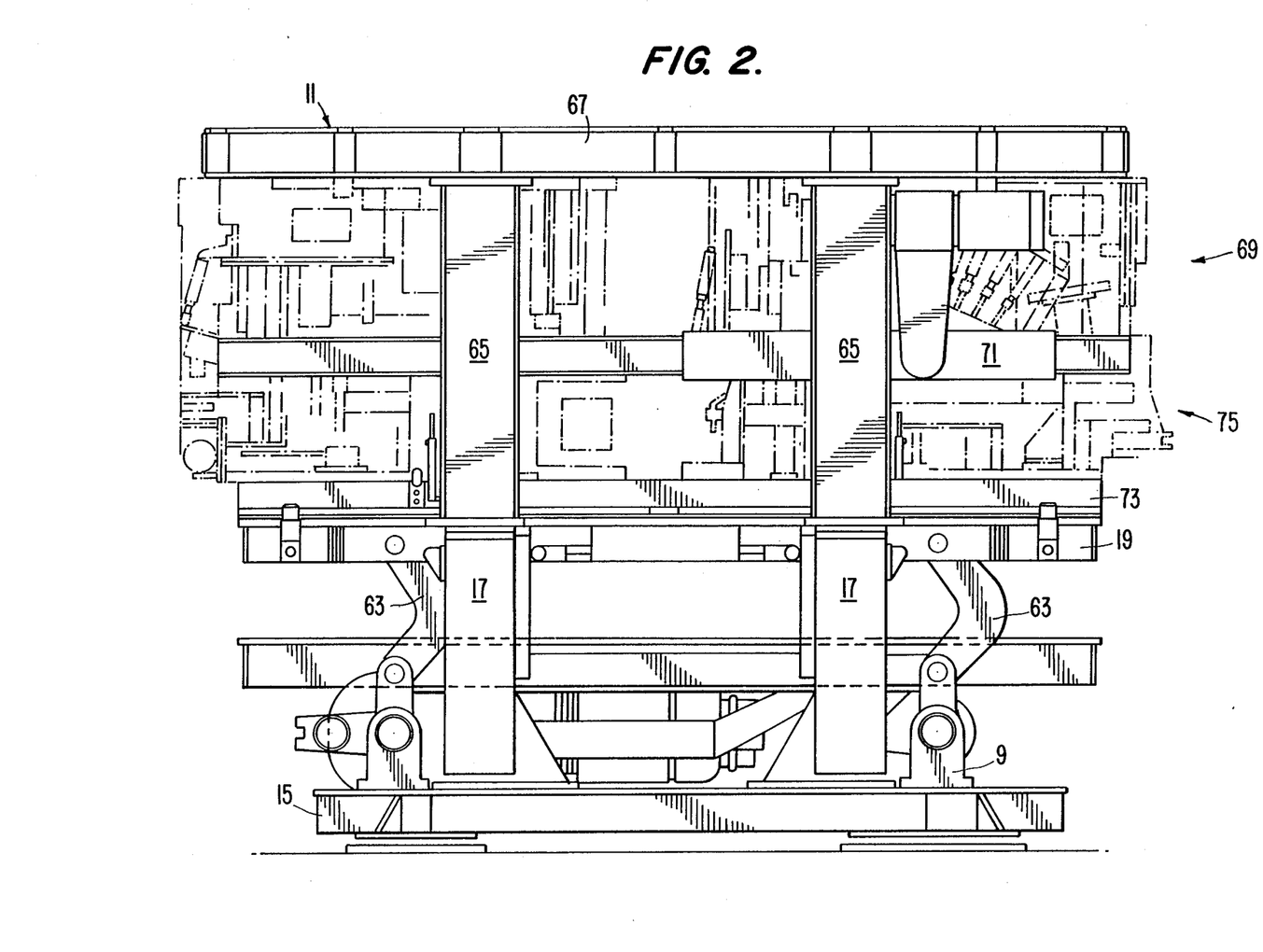
FIG. 2 shows a side view of the device shown in FIG. 1 but without the storage devices.

FIGS. 1 and 2 show the tool frame 11 which is to be mounted onto the lifting frame 9 to form the complete device. The tool frame 11 preferably comprises four columns 65 which are spaced and adapted in their distances apart and connections to the respective columns 17 of the lifting frame 9. The columns 65 are connected to one another by a head plate 67. Preferably most of the tools are fastened to the head plate 67 and are called upper tools 69. In FIG. 2, the tool frame 11 is shown with the upper tools 69 whereas in FIG. 1, the tool frame 11 is shown without tools to clarify the construction.

Preferably a conveying device 71 by which the workpiece to be processed can be inserted into the tool frame 11 or removed therefrom is attached to the columns 65. In addition, a base plate 73 is also detachably fastened to the columns 65 of the tool frame 11. As shown in FIG. 2, the base plate 73 supports lower tools 75. The base plate 73 is connected to each column 65 via a sleeve 77 which is attached to the column 65 and which meshes with a pin 79 secured to the base plate 73. The sleeves 77 and the pins 79 not only form a connection between both components but at the same time form a centering means so that the lower tools 75 are accurately located with respect to the upper tools 69. The precise functioning of the centering means and the connection between both components will be discussed hereinafter in connection with the description of a tool-changing operation.

As shown in FIG. 1, storage devices 13 for tool frames 11, preferably adjoin two sides of the lifting frame 9. Using storage devices 13, it is possible to have a tool frame 11 on standby which is not required immediately. Since each tool frame has various tools for processing different workpieces or for performing different operations and also, facultatively, conveying arms adapted to the different workpieces to be processed, it is possible by using the storage devices 13 to quickly move the desired tool frame 11 into its working position over the lifting frame 9. Provided for this purpose on the upper side of each storage device 13 are rollers (not shown) which ensure easy displaceability of tool frame 11. Furthermore, each storage device 13 is provided with a displacing unit 81. The displacing unit 81 is preferably driven by an electric motor 83. Tool frames 11 which are not being used are secured on the storage device 13 by a locking mechanism 85.

As already mentioned above, the present invention can be adapted to accommodate different workpieces or processing operations solely by removing one tool frame 11 to an open storage device 13 and displacing another tool frame 11 from another storage device 13 to the lifting frame 9. Such a tool change will now be described with reference to FIGS. 1, 4a, 4b, 4c and 5, assuming that to begin with, no tool frame 11 is located on the lifting frame 9. The tool frames 11 are accordingly located on the two storage devices 13 and are fixed there.

First, the desired tool frame 11 must be unlocked from the storage device 13 by releasing the locking mechanism 85. This can be done either manually or automatically. The tool frame 11 can now be displaced in the direction of the lifting frame 9. The displacement itself is effected by a driver 87 of the displacing unit 81. During this operation, the lifting table 19 of the lifting frame 9 is located in a lifted position in which its upper surface protrudes above the centering bolts 21 of its columns 17. In this position, the upper surface of the lifting table 19 is at the same time located in the plane in which the lower surface of the base plate 73 of the tool frame 11 slides on the rollers of the storage device. By this matching, it is possible for the base plate 73 of the tool frame 11 to be displaced over the centering bolts 21 on the lifting frame 9. The displacement is effected until the centering bolts 21 are opposite the appropriate receptacles in the columns 65 of the tool frame 11. In this position, only the base plate 73 of the tool frame 11 rests on the lifting frame 9, namely on its lifting table 19. The columns 65 of the tool frame 11, are not directly supported by columns 17 but are supported by base plate 73 through the sleeves 77 and the pins 79.

To transmit the force from the columns 65 to the base plate 73 via the sleeves 77 and pins 79, two bores 89 and 91 arranged one above the other are made in each sleeve. An adapted slot 93 in the pins 79 corresponds to these bores. Push-in bolts 95 are passed through each bore 89 or 91 of the sleeves 77 and through the allocated slots 93 in the pins. These slots 93 are adapted with regard to the bores 89 and 91 in such a way that, when push-in bolts 95 are inserted into both bores, a longitudinal clearance occurs in each case in the unloaded direction.

Since the entire tool frame 11 rests on the lifting frame 9 only through its base plate 73, the forces due to its weight are transmitted from the columns to the base plate 73 via the push-in bolts 95 inserted into the lower bores 91. This can be seen in FIG. 4a. In this state, the push-in bolts 95 inserted into the upper bores 89 are not loaded.

During the next step, the lifting table 19 is lowered. The columns 65 of the tool frame 11 consequently come to bear against the columns 17 of the lifting frame 9. An exact location is established by the centering bolts 21. In this position, it is now only the columns 65 of the tool frame 11 which rest on the lifting frame 9 while the base plate 73 now hangs on the columns 65. The result of this is that it is now only the push-in bolts passed through the upper bores 89 which transmit a force. The push-in bolts passed through the lower bores 91 are pulled out as shown in FIG. 4b.

Figure 4A:
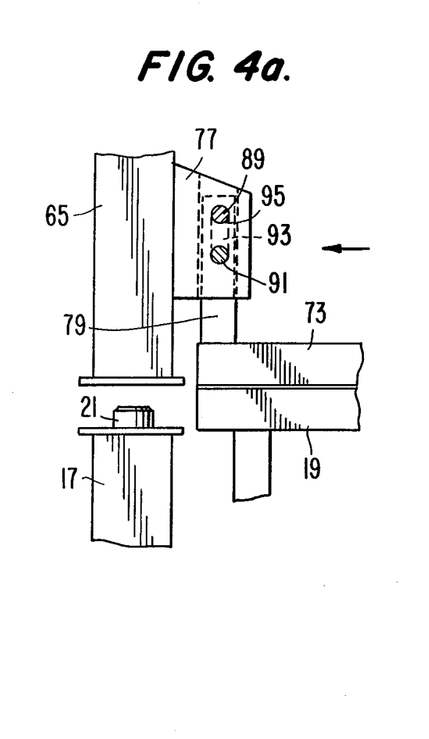
FIG. 4a shows a close-up of area Z of FIG. 1 when a tool frame is pushed onto the lifting table of the lifting frame.
Figure 4B:
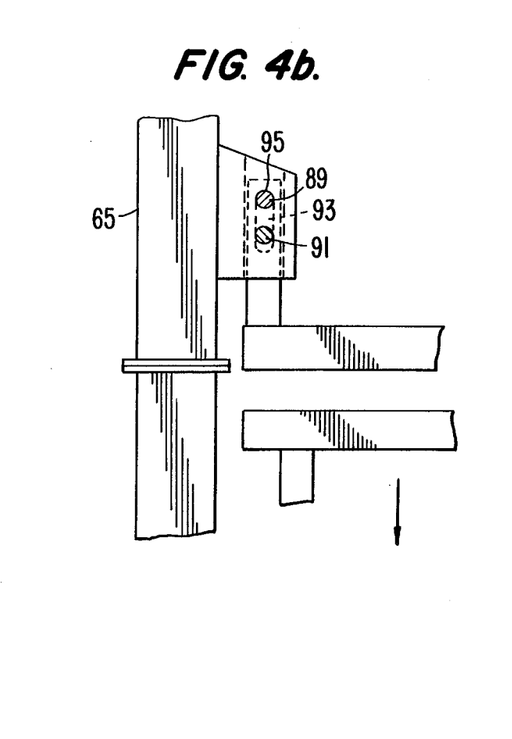
FIG. 4b shows a close-up of area Z of FIG. 1 in a position where the lifting table is lowered and the columns of the tool frame sit on the lifting frame.
Figure 4C:
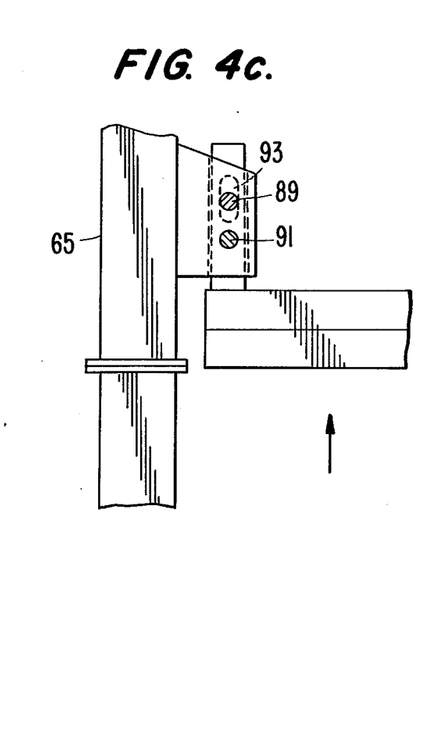
FIG. 4c shows a close-up of area Z of FIG. 1 in a position where the lifting table has been lifted slightly so that an interlocking system between the base plate of the tool frame and the column of the tool frame can be removed.

In the next step lifting table 19 is lifted to such an extent that the push-in bolts 95 passed through the upper bore 89 are also relieved and can be pulled out as shown in FIG. 4c. However, the bae plate 73 and the lifting table 19 are first connected by quick-acting connectors 97. It also goes without saying that the columns 65 of the tool frame 11 are held on the lifting frame 9 not only by gravitational force via the centering bolts 21 but that here, too, quick-acting connectors 97 secure the position.

Figure 5:
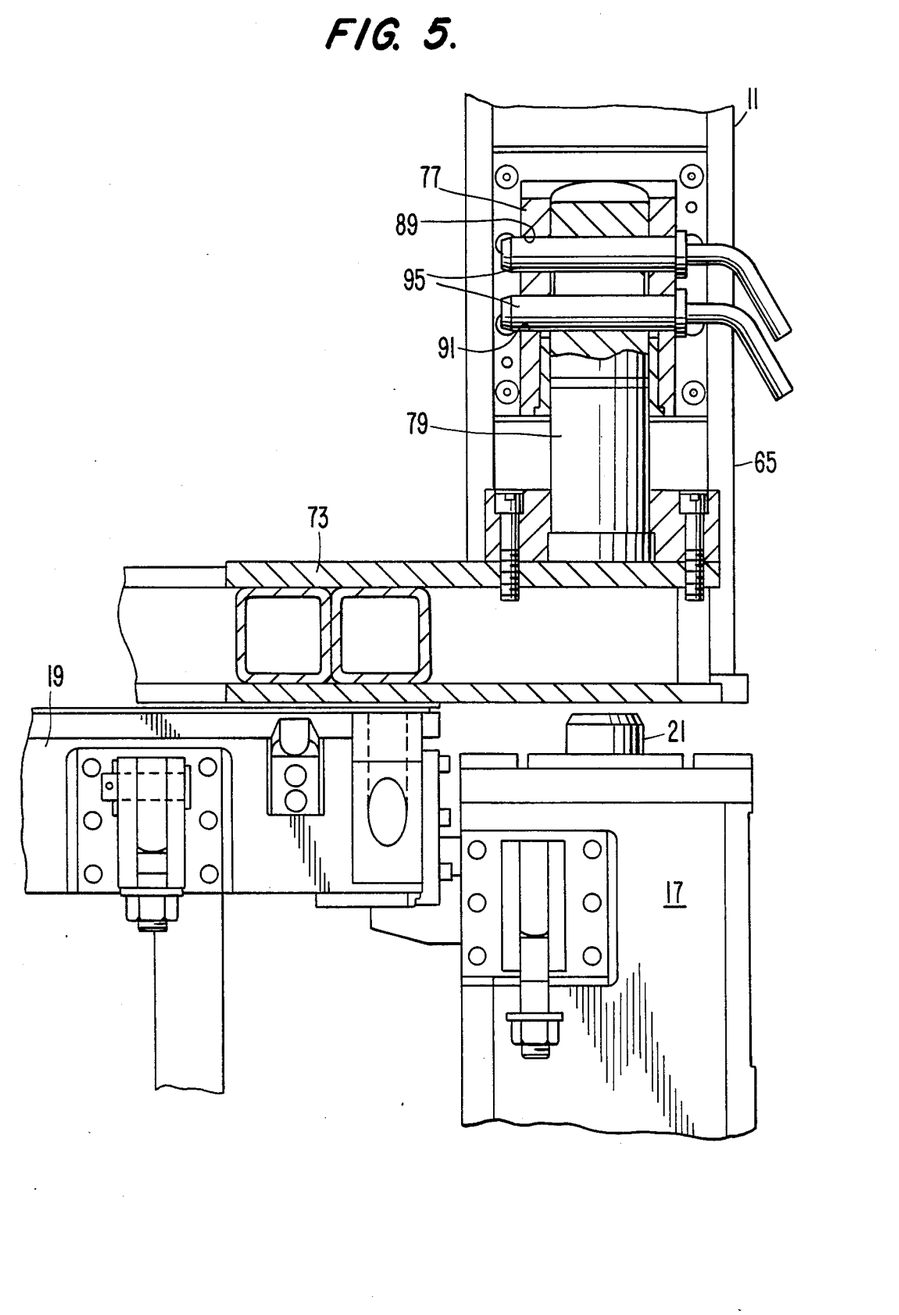
FIG. 5 shows a sectional side view of the area shown in FIGS. 4a where the base plate is fixed on a column of the tool frame.

The position shown in FIG. 5 corresponds to the position shown in FIG. 4a. By using two bolts instead of one, not only is increased safety ensured but the possibility is also created of connecting the tool frame to the lifting frame in the same manner if the tool frame is not to be exchanged by displacement but by a lifting device.

By the centering of the base plate 73 via the pins 79 and the sleeves 77 on the columns, an accurate positioning of the lower tools on the base plate with respect to the upper tools is ensured which, particularly in the case of welding tools, is important for good spot-weld quality, dimensional accuracy and long endurance of the electrodes. The centering referred to between base plate 73 and the rest of the tool frame 11 is effected during every lifting movement, namely when the lifting table 19 moves into the upper end position. It is also precisely in this position that the exact positioning of the lower tools and the upper tools is required.

The tool frame 11 is typically removed from the lifting frame 9 in the reverse sequence to that described above. For this purpose, it is necessary first of all for all quick-acting connectors 97 to be released. Then the lifting table 19 is raised or lowered slightly, as a result of which it is possible to insert push-in bolts 95 into the upper bores 89. The lifting table 19 is now lowered, as a result of which the base plate 73 hangs on the columns 65 via the push-in bolts 95 in the upper bores 89. It is also possible in this position to insert the push-in bolts into the lower bores 91. Finally, the base plate with the tool frame is lifted by means of the lifting table 19 to such an extent that it can be pulled in a plane by the displacing unit 81 onto the storage device 13 and locked there. The lifting frame 9 is now available for accommodating a second tool frame 11 standing by on the other storage device 13.

While a presently preferred embodiment of practicing the invention has been shown and described with particularity in connection with the accompanying drawings, the invention may otherwise be embodied within the scope of the following claims.

What is claimed is:

1. A device for processing workpieces, wherein a lower tool which receives the workpiece can be moved upward toward an upper tool by a lifting frame comprising:
   (a) a tool frame subdivided horizontally from the lifting frame and being mounted onto the lifting frame in an easily releaseable manner;
   (b) the tool frame comprising a plurality of columns, a head plate connected to the columns and a base plate detachably fastened to the columns;
   (c) the base plate having attached thereto the lower tool while the upper tool is attached to the tool frame but not the base plate; and
   (d) the lifting frame comprising a moveable lifting table which can be connected in a raised position to the base plate of the tool frame.

2. The device according to claim 1, wherein a conveying means is attached to the tool frame for inserting and removing the workpiece from the tool frame.

3. The device according to claim 1, wherein a plurality of storage devices for the tool frames adjoin the lifting frame.

4. The device according to claim 3, wherein each storage device further comprises a displacing unit for moving the tool frame from the lifting frame to the storage device and vice versa.

5. The device according to claim 4, wherein each storage device, on its upper side, utilizes a support means to provide easier displacement of the tool frame and a locking mechanism for the tool frame when stored thereon.

6. The device according to claim 2, wherein a plurality of storage devices for the tool frames adjoin the lifting frame.

7. The device according to claims 1, 2, 3, 4, 5 or 6 wherein the lifting table is moved by a crank mechanism.

8. The device according to claim 7, wherein the crank mechanism comprises a motor-gearbox unit, a plurality of driven shaft sections connected to the motor-gearbox unit and to a plurality of first crank linkages, and first crank pins attached to the first crank linkages which first crank pins accommodate a plurality of supports attached to the lifting table.

9. The device according to claim 8, wherein the crank mechanism further comprises four shaft sections each having a first crank linkage and a support, two driven shaft sections which are located opposite one another and are drivingly connected to a pair of non-driven shaft sections, and a second crank linkage which is provided on each shaft section such that one second crank linkage on one driven section and one second crank linkage on one non-driven section are connected to one another via second crank pins and a first transmission member.

10. The device according to claim 9 wherein each shaft section comprises a third crank linkage and a third crank pin, the third crank linkages forming an angle of 90° with the second crank linkages, and each third crank linkage on the driven shaft section is connected via a second transmission member to the third crank linkage on the non-driven shaft section.

11. The device according to claim 10, wherein a crank linkage is formed by two arms which are connected to one another by a crank pin and wherein adjacent crank linkages jointly use one arm.

12. The device according to claim 11, wherein a non-driven shaft section is interrupted and mounted on a side in such a way that a transmission member can pass through in-between unimpeded.

13. The device according to claim 12, wherein the transmission members and the supports acting on the lifting table are in an offset configuration to achieve a large swivel angle for the crank mechanism.

14. The device according to claim 13, wherein each of the two driven shaft sections is mounted in two bearings, the crank linkages are arranged between the bearings, and the driven shaft sections are constructed so as to be separable via flanges between the motor-gearbox unit and the bearing adjacent thereto.

15. The device according to claim 14, wherein the motor of the motor-gearbox unit is a direct-current motor.

16. The device according to claim 1 wherein the lifting table is guided on a plurality of columns of the lifting frame and interacts with a plurality of pressure cylinders which compensate for the weight of the table, the base plate and the lower tool.

17. The device according to claim 16, wherein the pressure cylinders are connected to an accumulator in such a way that a pressure medium passes into the accumulator when the lifting table is being lowered but has an assisting effect on the lifting movement when the lifting table is being raised.

18. The device according to claim 17, wherein hydraulic fluid serves as the pressure medium, a hydraulic unit is provided for building up and maintaining the pressure medium, and devices are provided for adapting the pressure level to various dead loads.

19. The device according to claim 1 wherein the lifting frame has a plurality of centering bolts at least one protruding upwardly from each column of the lifting frame for interacting with each column of the tool frame.

20. The device according to claim 1 wherein:
   (a) the base plate of the tool frame is connected by a plurality of bolts to the columns of the tool frame at least two locations which are opposite one another;
   (b) a component is provided on the base plate which has a perpendicular pin which has a plurality of slotted first bores adapted to receive the bolt, and
   (c) a sleeve is attached to the column of the tool frame for receiving the pin which sleeve has a plurality of second bores aligned with the slotted first bores of the pin such that the bolts may pass through.

21. The device according to claim 20, wherein there are two second bores in each sleeve, one located vertically above the other for the receiving the bolts, and wherein each pin has a slot of such a longitudinal extent that a longitudinal clearance occurs when the bolts are inserted into the two second bores and put through the slot.

22. The device according to claim 21, wherein the pin and the sleeve form a centering means when the lifting table is in the upper position.

23. A device for positioning sets of working tools at a work station comprising:
  (a) a lower support frame having a vertically displaceable lifting table;
  (b) an upper tool holding frame displaceable laterally relative to said lower support frame into and out of position in vertical alignment with said lower support frame, said upper tool holding frame having a base plate detachably mounted thereon and displaceable vertically relative thereto when detached therefrom;
  (c) a first set of tools mounted on said upper tool holding frame;
  (d) a second set of tools mounted on said base plate;
  (e) means for displacing said upper tool holding frame laterally to position said base plate upon and off of said lifting table when said lifting table is in an elevated position; and
  (f) means operative to lower said base plate with said upper tool holding frame supported thereon to rest said upper tool holding frame on said lower support frame with said base plate detachably supported thereon and to elevate said base plate after it has been detached from said upper tool holding frame to position said second set of tools relative to said first set of tools at said work station.

24. A device according to claim 23 including cooperating means mounted on said upper and lower frames for aligning said frames vertically.

25. A device according to claim 23 including cooperating means mounted on said upper tool holding frame and said base plate for aligning said upper tool holding frame and said base plate vertically.

26. A device according to claim 23 including means disposed on said lifting table and said base plate for locking said lifting table and said base plate together when said base plate is supported on said lifting table, detached from said upper tool holding frame and elevated to an operating position.

* * * * *